Patented May 7, 1935

2,000,621

UNITED STATES PATENT OFFICE 2,000,621

PROPIONATION OF CELLULOSIC MATERIAL

Cyril J. Staud and Russel H. Van Dyke, Rochester, N. Y., assignors to Eastman Kodak Company, Rochester, N. Y., a corporation of New York No Drawing. Application January 14, 1933, Serial No. 651,856

8 Claims. (Cl. 260—101)

The present invention relates to the employment of $SO_2$—$NO_2$ as a catalyst in processes in which cellulosic materials are propionated.

In the propionation of cellulosic materials as sometimes carried out commercially in which propionic acid and/or anhydrid of a technical grade is employed the resulting dope or reaction mixture is sometimes discolored resulting in a final product which is grayish in color rather than truly white. Such a product is not satisfactory for the preparation of colorless, transparent products such as films or sheets as a truly white product, due for instance, to the poorer transmission of light of the former. The present invention provides a process for the preparation of propionyl esters of cellulose with technical propionyl supplying materials in which a product is obtained which is substantially free from discoloration and which gives a very clear brilliant solution in the common organic solvents.

One object of our invention is to provide a process for the preparation of propionyl-containing esters of cellulose in which a catalyst is employed which is corrective of the discoloration of the resulting ester which discoloration is sometimes found in the propionyl-containing esters of cellulose. Another object of our invention is to provide a process for preparing propionyl-containing esters of cellulose, such as cellulose-acetate-propionate which allows better control of the esterification reaction than is possible with a commonly employed catalyst such as sulfuric or chlorsulfonic acids when employed in similar fashion. This allows better control of the preparation of a finished product which is more free from unesterified fibers, grain and haze than when for instance, sulfuric acid is employed. Another object of our invention is to provide a process for preparing propionyl-containing esters of cellulose in which the viscosity of the product formed is higher than in like processes in which zinc chloride or sulfuric acid is employed as the catalyst. This higher viscosity is evidence that the degradation of the cellulose is much less than that which occurs in processes using other catalysts such as zinc chloride or sulfuric acid for example.

We have found that cellulose materials such as cotton linters or esterifiable cellulose derivatives may be easily converted into propionyl-containing cellulose esters by treating them in a bath adapted for introducing propionyl groups thereto in the presence of a mixture of $SO_2$ and an oxide of nitrogen. The oxides of nitrogen which may be employed for this purpose include nitrogen peroxide or dioxide, nitrogen tetroxide or for that matter any of the higher oxides of nitrogen. Nitric oxide also may be employed in the presence of air or some other source of available oxygen.

As pointed out above, our present invention is adapted to the preparation of the propionyl-containing esters of cellulose in general. The employment of our invention for the preparation of cellulose acetate-propionate is especially contemplated particularly when it is prepared by reacting upon cellulose with a reaction mixture containing propionic acid and acetic anhydride together with the $SO_2$—$NO_2$ catalyst.

The sulfur dioxide and oxide of nitrogen may be added to the reaction bath in various ways. For example either one or both of the gases may be dissolved in the bath employed for the pretreatment of the cellulose or they may be added during the esterification step. If no pretreatment is employed the gases ($SO_2$ and $NO_2$) will of course be added to the esterification bath proper. The catalyst may be added either by bubbling it into the esterification bath or by first absorbing the gas in one of the ingredients which is to be employed. Various other permutations of the methods of introducing the $SO_2$—oxide of nitrogen catalyst will be obvious to those skilled in the art.

Altho the preparation of the propionyl-containing esters of cellulose in "dope" form, that is dissolved in the reaction mixture, is principally contemplated by our invention, our invention may also be employed in a "fibrous" esterification process for the preparation of these esters. Some of the non-solvents which may be employed are carbon tetrachloride, benzene, or a higher ether having a boiling point above 70° C. The employment of the higher ethers in the fibrous esterification of cellulose is disclosed and claimed in Malm and Fletcher application Serial No. 590,509, filed Feb. 2, 1932.

Altho the concentrations of $SO_2$ and the oxide of nitrogen in the esterification bath may be varied according to the judgment of the individual operator, we have found that concentrations of approximately 5% to 25% of sulfur dioxide and an equivalent amount of the oxide of nitrogen based on the weight of cellulose employed, will be usually quite suitable.

The following example illustrates the introduction of propionyl groups into cellulose according to the process of our invention:

$SO_2$ gas was passed into a mixture of 25 lbs. of propionic acid and 30 lbs. of 93% acetic anhydride until about 2 lbs. of the gas was dissolved. This mixture was then added to 10 lbs. of cotton linters and 3 lbs. of liquid NO₂ was then introduced. The esterification started at 20° C. and the temperature was raised to 40° C. over a period of about 2 hours. An extremely viscous reaction mass or "dope" formed which was mixed with acetone to render it more fluid. The cellulose acetate-propionate formed was precipitated from the dope by pouring into water, subjected to agitation or stirring. Upon drying, a white, fluffy product resulted. The resulting ester was analyzed and found to have a nitrogen content of 1.43%, an apparent acetyl content of 43.85% and a melting point of 254° C.

The present invention is also applicable to the preparation of the simple propionic ester of cellulose. For instance in the above example an impelling anhydrid such as chloracetic or an alkoxy acetic anhydride could be employed instead of acetic anhydride. As was pointed out above an esterifiable cellulose derivative could be employed as the starting material of the process of the present invention, such as a cellulose acetate, nitrate or ether containing free and available hydroxyl groups. When the starting material is to be a cellulose, it is preferred to employ cotton linters, this material being inexpensive and readily susceptible to esterification, however, other celluloses such as reverted cellulose, esterifiable sulfite wood pulp etc. may be employed where desired and compatible.

Various other modifications of our invention made possible by the varying of technical details such as time, temperatures, proportions etc. by those skilled in the art also come within the scope of our invention and covered by the appended claims.

Whenever the term "cellulosic material" is employed herein it refers to both materials containing cellulose proper and those containing cellulose which has been reacted upon but which contains free and available hydroxy groups.

What we claim is:

1. The process of preparing a propionyl-containing ester of cellulose which comprises propionating cellulosic material in a bath containing propionyl groups and an impelling anhydride in the presence of a catalyst consisting of sulfur dioxide and an oxide of nitrogen of which the oxygen constitutes more than 50% by weight of the compound.

2. The process of preparing a propionyl-containing ester of cellulose which comprises propionating cellulosic material in a non-solvent bath containing propionyl groups, an impelling anhydride, and a catalyst consisting of sulfur dioxide and an oxide of nitrogen of which the oxygen constitutes more than 50% by weight of the compound.

3. The process of preparing a propionyl-containing ester of cellulose which comprises propionating cellulosic material in a bath containing propionyl groups and an impelling anhydride in the presence of a catalyst consisting of sulfur dioxide and nitrogen peroxide.

4. The process of preparing a propionyl-containing ester of cellulose which comprises propionating cellulosic material in a non-solvent bath containing propionyl groups, an impelling anhydride, and a catalyst consisting of sulfur dioxide and nitrogen peroxide.

5. The process of preparing cellulose acetate-propionate which comprises reacting upon cellulosic material with a bath containing propionic acid, acetic anhydrid and a catalyst consisting of sulfur dioxide and an oxide of nitrogen of which the oxygen constitutes more than 50% by weight of the compound.

6. The process of preparing cellulose acetate-propionate which comprises reacting upon cellulosic material with a bath containing propionic acid, acetic anhydrid and a catalyst consisting of sulfur dioxide and nitrogen peroxide.

7. The process of preparing a propionyl-containing ester of cellulose which comprises propionating cellulosic material in a bath containing carbon tetrachloride propionyl groups, an impelling anhydride, and a catalyst consisting of sulfur dioxide and an oxide of nitrogen of which the oxygen constitutes more than 50% by weight of the compound.

8. The process of preparing a propionyl-containing ester of cellulose which comprises propionating cellulosic material in a bath containing carbon tetrachloride propionyl groups, an impelling anhydride, and a catalyst consisting of sulfur dioxide and nitrogen peroxide.

CYRIL J. STAUD.
RUSSELL H. VAN DYKE.